No. 683,737.
A. H. W. EIKMEIER.
POTATO GATHERER.
(Application filed June 14, 1901.)
(No Model.)
Patented Oct. 1, 1901.
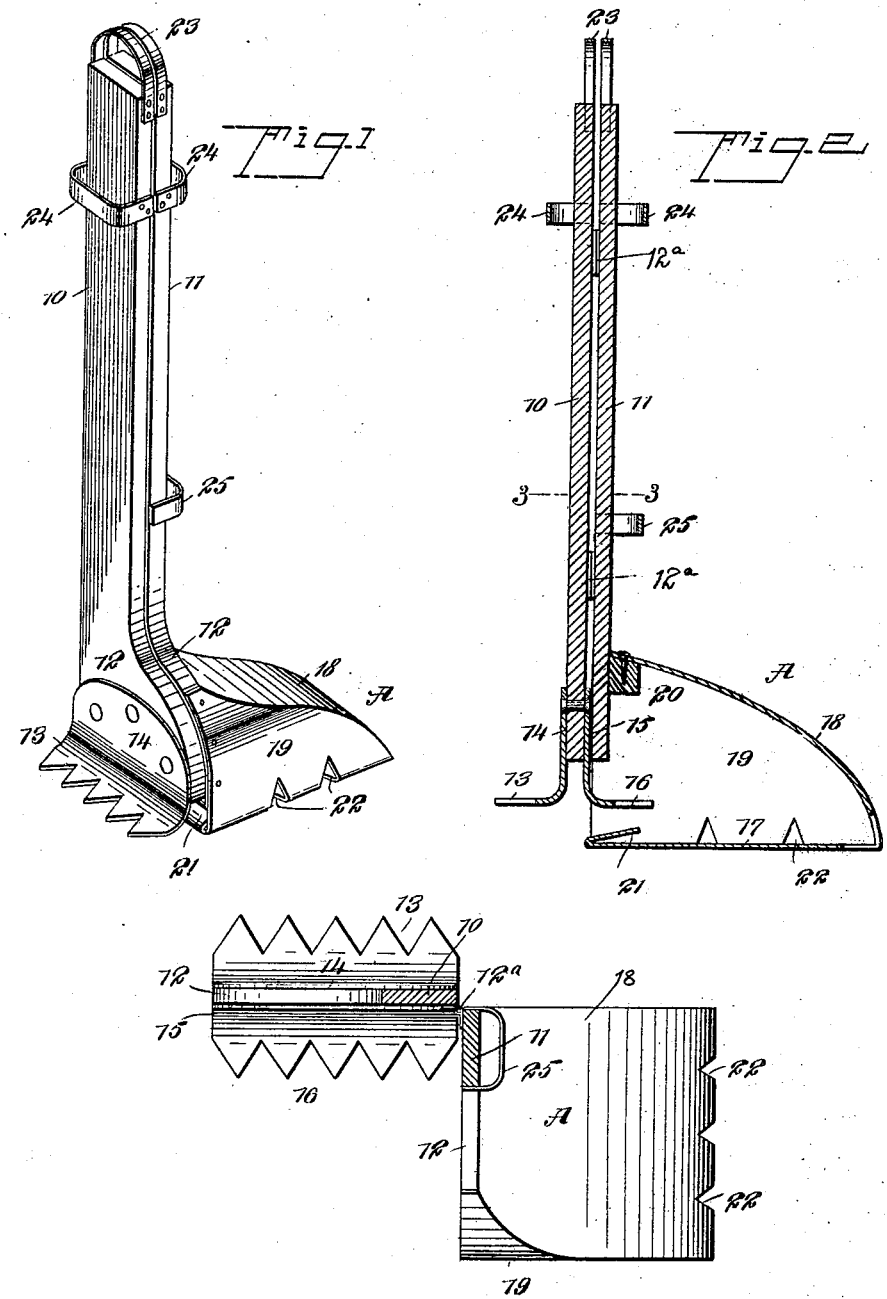
WITNESSES:
INVENTOR
August H. W. Eikmeier.
BY
ATTORNEYS

UNITED STATES PATENT OFFICE.

AUGUST H. W. EIKMEIER, OF NEAR MANNING, IOWA.

POTATO-GATHERER.

SPECIFICATION forming part of Letters Patent No. 683,737, dated October 1, 1901.

Application filed June 14, 1901. Serial No. 64,528. (No model.)

*To all whom it may concern:*

Be it known that I, AUGUST H. W. EIKMEIER, a citizen of the United States, and a resident of the county of Crawford, near Manning, in the county of Carroll, State of Iowa, have invented a new and Improved Potato-Gatherer, of which the following is a full, clear, and exact description.

The purpose of the invention is to so construct a device for gathering or picking up potatoes that the potatoes may be quickly and conveniently raked from loose dirt in a hill and directed to a receptacle having means for discharging any dirt that may enter the receptacle with the potatoes.

A further purpose of the invention is to construct a device of the character described which will be light, durable, and effective and to provide the device with a rake, whereby potatoes partially buried in the ground may be quickly and safely brought to the surface.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the device. Fig. 2 is a longitudinal vertical section through the device; and Fig. 3 is a horizontal section on the line 3 3 of Fig. 2, the device being in an open position.

The body of the device consists of two bars 10 and 11, preferably of equal dimensions, the said bars having transverse enlargements 12 at their bottom portions, and these bars are connected by hinges 12ª or their equivalents, so that the bars 10 and 11 of the body may be carried at angles to each other, as shown in Fig. 3, or the bars may be brought parallel and close together, as is shown in Figs. 1 and 2. A series of teeth 13 extend from the bottom portion of the outer face of the body-bar 10, the teeth being slightly below the lower end of the enlarged section 12 of said body-bar, and these teeth are at a right angle to the body-bar and are connected to said body-bar by means of an integral plate 14. A second plate 15 is secured to the inner face of the body-bar 10, and at the bottom of this plate a series of horizontal teeth 16 is formed, which teeth 16 when the body-bars 10 and 11 are brought together enter a receptacle A, carried by the body-bar 11, and conduct the potatoes into said receptacle. This receptacle A is made of any suitable material, and comprises, preferably, a flat bottom 17, an arched top 18, which meets the bottom at its outer edge, and sides 19, the inner portion of the arched top 18 being usually secured to a batten 20, transversely attached to the outer face of the body-bar 11, as is especially shown in Fig. 2. The lower portion of the body-bar 11 partially closes the upper inner side of the receptacle A, and as the bottom of the receptacle is some distance below the bottom of the body-bar 11 the lower portion of the inner side of this receptacle A is open. The potatoes are prevented from leaving the receptacle A after having been introduced therein preferably through the medium of an upwardly-inclined and inwardly-extending plate 21, which preferably forms a portion of the inner edge of the bottom 17 of the receptacle. This receptacle A is provided with any desired number of openings 22 in its front and sides for the discharge of dirt that may enter the receptacle with the potatoes. Narrow handles 23 are secured to the upper portions of the body-bars 10 and 11, enabling a person to hold the body-bars in closed position with one hand, and at the outer face of each body-bar 10 and 11 near the top a horizontal handle 24 is secured, while an additional horizontal handle 25 is attached to the outer face of the body-bar 11 near its lower portion.

In operation when potatoes are to be picked up the machine is grasped by the handles 24 and the body-bars 11 are opened and closed as the workman proceeds along the row, the bottom of the device resting on the ground, and the inner rake or teeth 16 will carry the potatoes lying loose on the ground into the receptacle A, gathering the said potatoes as the body-bars are closed, and when a sufficient quantity of potatoes have been received by the receptacle A the two handles 24 and 25 are grasped and the potatoes are dumped out from the receptacle through its open inner portion, the two body-bars 10 and 11 being then in an open position.

The rake-teeth 13 are especially adapted for removing potatoes that are partially covered by the soil and bringing the potatoes to the surface, so that they may be conducted into the receptacle A by the opposing rake-teeth 16, and when the rake-teeth 13 are thus used the two body-bars 10 and 11 are held closed by a hand grasping the upper handles 23.

By the use of a device of this description a person can travel along the hills, gather up all the potatoes lying on the surface of the ground, and remove from the soil any potatoes that may have escaped the action of the plow or other implement used to unearth the potatoes, and when a sufficient quantity of potatoes have been gathered the potatoes can be emptied from the receptacle A into baskets or bags placed to receive them.

Having thus described my invention, I claim as new and desire to secure by Letters Patent—

1. A potato-gatherer consisting of two body elements having a hinged connection to swing on a horizontal plane one relatively to the other, a receptacle carried by one of the body elements, and a rake carried by the other body element, arranged to enter the said receptacle when the two body elements are brought in near relation, as described.

2. A potato-gatherer consisting of two body elements having a hinged connection, a receptacle open at one side and secured to one of the body elements, the said receptacle being provided with openings for the discharge of dirt and with an inclined retarding member at its open receiving portion, a rake attached to the other body element, which rake is horizontally disposed and is adapted to enter the receiving portion of the said receptacle, and handles attached to the body elements, for the purpose described.

3. In a potato-gatherer, the combination, with two body elements having a hinged connection, one of which elements is provided with an attached receptacle extending below its bottom, being open at its inner side, the receptacle having openings for the discharge of dirt and a retarding member at its open or receiving side, forming a portion of the bottom of the receptacle, of rakes secured to the bottom portion of the other body element, which rakes are at the inner and outer sides of the said element, extending horizontally in opposite directions, one of the rakes being adapted to enter the said receptacle, and handles attached to the sides and top portions of the body elements, as and for the purpose set forth.

In testimony whereof I have signed my name to this specification in the presence of two subscribing witnesses.

AUGUST H. W. EIKMEIER.

Witnesses:
R. G. SUTHERLAND,
A. F. McENTURFF.